United States Patent [19]

Maruyama et al.

[11] Patent Number: 4,652,049

[45] Date of Patent: Mar. 24, 1987

[54] DEVICE FOR ADJUSTING HEIGHT OF FRONT PART OF SEAT CUSHION OF SEAT

[75] Inventors: Katsuaki Maruyama; Yaichi Oishi; Takami Terada; Motoi Hyodo, all of Toyota, Japan

[73] Assignees: Toyota Jidosha Kogyo Kabushiki Kaisha; Aishin Seiki Kabushiki Kaisha, both of Japan

[21] Appl. No.: 867,625

[22] Filed: May 27, 1986

Related U.S. Application Data

[63] Continuation of Ser. No. 391,713, Jun. 24, 1982, abandoned.

[30] Foreign Application Priority Data

Jun. 26, 1982 [JP] Japan ................... 56-95570[U]

[51] Int. Cl.⁴ .............................................. B60N 1/02
[52] U.S. Cl. ...................................... 297/284; 297/313
[58] Field of Search ............... 297/284, 313, 337, 362, 297/361; 5/79; 248/396; 108/7

[56] References Cited

U.S. PATENT DOCUMENTS

| 945,449 | 1/1910 | Edgcombe | 5/79 |
|---|---|---|---|
| 968,006 | 8/1910 | Visger | 5/79 |
| 1,269,868 | 6/1918 | Sinjem | 5/79 |
| 1,580,606 | 4/1926 | Jones | 297/284 |
| 1,968,970 | 8/1934 | Steele | 5/79 |
| 2,016,119 | 10/1935 | Owler et al. | 297/362 |
| 2,049,550 | 8/1936 | Dresser et al. | 297/284 |
| 2,596,760 | 5/1952 | Bryant | 297/361 |
| 3,178,221 | 4/1965 | Schwarz | 297/284 |
| 3,460,793 | 8/1969 | Posh | 248/396 |
| 3,550,953 | 12/1970 | Neale | 297/284 |
| 3,883,173 | 5/1975 | Shephard et al. | 297/284 |
| 4,018,477 | 4/1977 | Hogan | 297/284 |
| 4,469,374 | 9/1984 | Kashihara et al. | 297/362 X |

FOREIGN PATENT DOCUMENTS

| 279086 | 6/1969 | Fed. Rep. of Germany | 108/6 |
|---|---|---|---|
| 2231402 | 1/1974 | Fed. Rep. of Germany | 297/361 |
| 2603980 | 8/1976 | Fed. Rep. of Germany | 297/284 |
| 2727948 | 1/1979 | Fed. Rep. of Germany | 297/284 |
| 2736550 | 2/1979 | Fed. Rep. of Germany | 297/284 |
| 60930 | 4/1982 | Japan | 297/313 |
| 193497 | 2/1923 | United Kingdom | 297/361 |
| 1202017 | 8/1970 | United Kingdom | 297/337 |

Primary Examiner—Kenneth J. Dorner
Assistant Examiner—Thomas A. Rendos
Attorney, Agent, or Firm—Parkhurst & Oliff

[57] ABSTRACT

A device for adjusting the height of a cushion pad in the front part of the seat cushion of a seat, for example, for a vehicle, which has a hard plate disposed laterally of the seat cushion under the cushion pad, and a rotating mechanism connected to a shaft disposed under the cushion pad for rockably moving the front edge of the hard plate elevationally up and down between a position in the vicinity of the seat cushion frame and an upper position remote from the seat cushion frame. With this connection, the device can simultaneously adjust the height and the hardness of the cushion pad in response to the occupant's individual favorite value.

5 Claims, 3 Drawing Figures

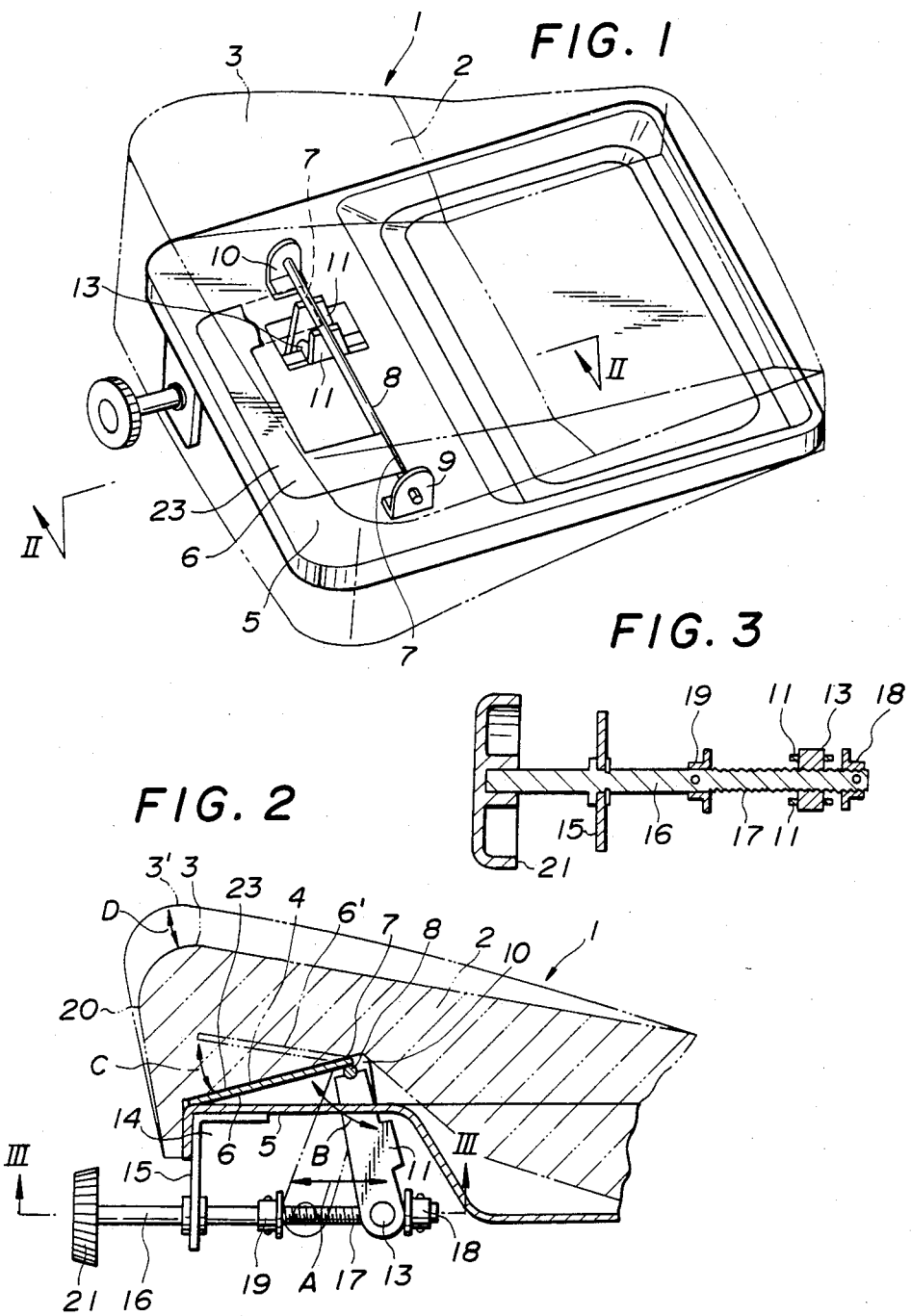

DEVICE FOR ADJUSTING HEIGHT OF FRONT PART OF SEAT CUSHION OF SEAT

This is a continuation of application Ser. No. 391,713, filed June 24, 1982, now abandoned.

BACKGROUND OF THE INVENTION

This invention relates to a device for adjusting the height of a cushion pad in the front part of the seat cushion of a seat, e.g., an automotive seat or the like and, more particularly, to an improvement in a device for adjusting the height of a cushion pad in the front part of the seat cushion of a seat.

A variety of seats capable of being adjusted in the height of the front part of a seat cushion have already been proposed. However, these seats had such drawbacks and disadvantages that their adjusting mechanisms have been complicated with a large number of components and parts, causing an increase in their costs. Since the manipulating handle of the mechanism was disposed at the side of the seal cushion, only a narrow space was allowed between the seat cushion and the door of a vehicle, hence deteriorating the maneuverability of the handle.

SUMMARY OF THE INVENTION

It is, accordingly, a primary object of this invention to provide an improved device for adjusting the height of a cushion pad in the front part of the seat cushion of a seat, which device can simultaneously adjust the height and the hardness of the cushion pad in response to the occupant's individual favorite value by rotating a hard plate disposed under the cushion pad with a handle located at the front of the seat cushion.

Another object of this invention is to provide an improved device for adjusting the height of a cushion pad in the front part of the seat cushion of a seat, which device can carry out the optimum physiologically supporting performance of the individual occupant on the seat.

Yet another object of this invention is to provide an improved device for adjusting the height of a cushion pad in the front part of the seat cushion of a seat, which device can prevent the forwardly sliding phenomenon of an occupant sitting on the seat.

Still another object of this invention is to provide an improved device for adjusting the height of a cushion pad in the front part of the seat cushion of a seat, which device can reduce the number of components, thereby incorporating relatively simple construction inexpensively.

Still another object of this invention is to provide an improved device for adjusting the height of a cushion pad in the front part of the seat cushion of a seat which can improve its maneuverability by disposing a handle on the front of the seat cushion.

BRIEF DESCRIPTION OF THE DRAWINGS

The above and other related objects and features of the invention will be appparent from a reading of the following description of the disclosure found in the accompanying drawings and novelty thereof pointed out in the appended claims.

FIG. 1 is a schematic perspective view of one preferred embodiment of the device for adjusting the height of a cushion pad in the front part of the seat cushion according to the present invention;

FIG. 2 is a side elevational sectional view of the seat cushion taken along the line II—II in FIG. 1; and FIG. 3 is a bottom sectional view of the operating shaft used in the seat cushion taken along the line III—III in FIG. 2.

DESCRIPTION OF THE PREFERRED EMBODIMENTS

The present invention will now be described in more detail with respect to the accompanying drawings.

In FIGS. 1 and 2, between the lower surface 4 of the front side part 3 of a cushion pad 2 covered with a surface material, and a seat cushion frame 5 of the seat cushion 1 of a seat is laterally disposed a hard plate 6 formed of an iron plate or hard synthetic resin, etc. in the seat cushion 1.

This hard plate 6 is fixedly secured at the rear side edge 7 of the seat cushion 1 to a rotatable shaft 8, which is in turn journaled rotatably to brackets 9 and 10 at both ends thereof. The brackets 9 and 10 are secured to both sides of a seat cushion frame 5.

To the shaft 8 are fixedly secured rotatable arms 11 extending downwardly from the seat cushion frame 5. A nut 13 is supported by the lower ends of the arms 11.

The front edge of the seat cushion frame 5 is bent upwardly in an inverted U shape to form a cavity 14 under the bent front edge of the frame 5, and a bracket 15 fixedly secured to the frame 5 depends at the front side of the cavity 14. An operating shaft 16 journaled at the intermediate part thereof to the bracket 15 extends longitudinally of the seat cushion 1.

A threaded part 17 is formed at the rear part of the operating shaft 16, is engaged with the nut 13 supported by the arms 11 as described above, and stoppers 18 and 19 are secured to both the front and the rear ends of the threaded part 17 of the operating shaft 16.

To the front end of the operating shaft 16 extending under the front part 20 of the seat cushion 1 through the bracket 15 is attached a rotatable handle 21.

When the operating shaft 16 is normally or reversely rotated by the handle 21, the nut 13 described above will move forwardly or backwardly in directions shown by the arrows A. Since the shaft 8 is journaled to the brackets 9 and 10, the arms 11 and the shaft 8 will rotate in the directions shown by arrows B as the nut 13 is thus moved forwardly or backwardly as described above. When the arms 11 and the shaft 8 are thus rotated, the hard plate 6 will elevationally rockably move upwardly and downwardly in the directions designated by arrows C in FIG. 2. That is, the hard plate 6 is rockably moved at the front edge 23 between the position indicated by solid lines in the vicinity of the seat cushion frame 5 and the upper position indicated by two-dotted chain lines 6' remotely from the frame 5 in FIG. 2.

Since the rockable movements of the hard plate 6 in the directions designated by the arrows C act to lift the front side part 3 of the cushion pad 2 from below to above, the front side part 3 will elevationally move rockably up and down in the directions designated by arrows D.

Since the cushion pad 2 is compressed when the hard plate 6 is rockably moved to the position designated by reference numeral 6' in FIG. 2 and the front side part 3 of the cushion pad 2 is thus lifted to the position designated by the two-dotted chain line 3' in FIG. 2, the hardness of the cushion pad 2 is increased. That is, according to the present invention, when the height of the front part of the seat cushion 1 is adjusted in this manner, the hardness of the cushion pad 2 is simultaneously adjusted to become hard or soft, by compression.

It is noted that a mechanism for driving the shaft 8 by the handle 21 may be a mechanism other than that shown and described above.

It will be appreciated from the foregoing description that with the device for adjusting the height of the cushion pad in the front part of the seat cushion of the seat according to the present invention so constructed, so that the handle disposed at the front part of the seat cushion can be turned normally or reversely to rockably move the hard plate disposed under the cushion pad at the front side part of the seat cushion elevationally up and down, the height of the cushion pad in the front part of the seat cushion of the seat can be adjusted to the occupant's individual favorite value and the hardness of the cushion pad can also be simultaneously adjusted to the same value as the above favorite value, thereby carrying out the optimum physiologically supporting performance and also preventing the forwardly sliding phenomenon of an occupant sitting on the seat.

Inasmuch as the construction of the device for adjusting the height of the cushion pad in the front part of the seat cushion of the invention can be thus relatively simplified as described above, the number of components in the device can be reduced, thereby decreasing the cost, and since the handle of the device can be disposed at the front part of the seat cushion, the maneuverability of the device can be improved.

What is claimed is:

1. A device for adjusting the height and hardness of a front part of a seat cushion of a seat comprising:
    a seat cushion having a front part thereof;
    a seat cushion frame for supporting said seat cushion;
    a plurality of frame brackets secured to said seat cushion frame;
    a planar plate disposed beneath the seat cushion, said planar plate having a forward end and a rear end;
    a first pivotal shaft having an axis, said first pivotal shaft being fixedly secured to said rear end of said planar plate, and pivotally mounted to said frame brackets;
    a plurality of pivotal arms, each of said pivotal arms having first and second ends thereof, said first end of each of said pivotal arms being fixedly secured to said first pivotal shaft;
    threaded nut means pivotally mounted to said second ends of each of said pivotal arms;
    an operating shaft having a threaded portion, said threaded portion engaging the threads of said threaded nut means;
    a support bracket for rotatably supporting said operating shaft, said support bracket having a first end secured to said seat cushion frame and a second end which is left free;
    whereby rotation of said operating shaft causes the entire planar plate to pivot to any position between a first position, wherein said forward end of said planar plate is above the axis of said first pivotal shaft, and a second position, wherein said forward end of said planar plate is below said axis of said first pivotal shaft.

2. The device according to claim 10, further comprising:
    stoppers secured to front and rear ends of said threaded portion of said operating shaft; and
    a handle attached to a front part of said operating shaft for rotating said operating shaft, said operating shaft extending through said support bracket to the front part of the seat.

3. The device according to claim 1, wherein said planar plate is formed of a material selected from the group consisting of iron and hard synthetic resin.

4. The device according to claim 1, wherein said planar plate further comprises a substantially U-shaped member, the cross bar of the U-shaped member comprising said front end of said planar plate and the free ends of said U-shaped member together comprising said rear end of said planar plate.

5. The device according to claim 4, wherein said first pivotal shaft comprises a single longitudinally extending shaft extending across and beyond said U-shaped ends of said planar plate, said portions of said shaft extending beyond said U-shaped ends of said planar plate being mounted to said frame brackets.

* * * * *